(12) United States Patent
Chen (10) Patent No.: US 11,696,566 B2
(45) Date of Patent: Jul. 11, 2023

(54) FILTER ASSEMBLY AND PORTABLE WATER FEEDER

(71) Applicant: Dongguan Jiasheng Enterprise Co., Ltd, Guangdong (CN)

(72) Inventor: Silong Chen, Guangdong (CN)

( * ) Notice: Subject to any disclaimer, the term of this patent is extended or adjusted under 35 U.S.C. 154(b) by 780 days.

(21) Appl. No.: 16/681,257

(22) Filed: Nov. 12, 2019

(65) Prior Publication Data

US 2021/0007324 A1      Jan. 14, 2021

(30) Foreign Application Priority Data

Jul. 12, 2019   (CN) .......................... 201921099298.0
Jul. 12, 2019   (CN) .......................... 201921099332.4

(51) Int. Cl.
| | |
|---|---|
| *A01K 7/00* | (2006.01) |
| *C02F 1/00* | (2023.01) |
| *C02F 1/28* | (2023.01) |
| *B01D 29/13* | (2006.01) |
| *B01D 15/10* | (2006.01) |
| *C02F 103/20* | (2006.01) |

(52) U.S. Cl.
CPC .............. *A01K 7/005* (2013.01); *B01D 15/10* (2013.01); *B01D 29/13* (2013.01); *C02F 1/001* (2013.01); *C02F 1/281* (2013.01); *B01D 2201/0415* (2013.01); *C02F 2103/20* (2013.01); *C02F 2303/02* (2013.01)

(58) Field of Classification Search
CPC ....................................................... A01K 7/005
See application file for complete search history.

(56) References Cited

U.S. PATENT DOCUMENTS

| | | | | |
|---|---|---|---|---|
| 2003/0226800 | A1* | 12/2003 | Brown ................... | B01D 29/58 210/497.01 |
| 2009/0241844 | A1* | 10/2009 | Becattini, Jr. ........ | A01K 5/0135 119/61.5 |
| 2017/0362092 | A1* | 12/2017 | Mainini .................. | C02F 9/005 |

FOREIGN PATENT DOCUMENTS

CN            207803161 U  *  9/2018  ............... A01K 7/02

* cited by examiner

*Primary Examiner* — Peter Keyworth (57) ABSTRACT

The present invention relates to water feeder technical field, more particularly to a filter assembly and a portable water feeder. The filter assembly includes a tray and a filter piece; the tray comprises a bottom frame with a bottom plate and a supporting wall and a supporting ring, the supporting wall is arranged around its circumference of the bottom plate and extends upward, the supporting wall and the bottom plate are jointly surrounded to form a cavity, and the bottom plate is provided with a number of filter holes; the supporting ring is arranged above the bottom frame and is connected to its top of the supporting wall, the filter piece is placed in the cavity. When the filter assembly is used, water flows from the filter hole into the filter piece, and the filter assembly has the advantages of simple and compact structure.

9 Claims, 9 Drawing Sheets

FILTER ASSEMBLY AND PORTABLE WATER FEEDER

CROSS-REFERENCE TO RELATED APPLICATIONS

This application claims the benefit of priority from Chinese Patent Application No. CN 201921099332.4 and CN 201921099298.0, both filed on Jul. 12, 2019. The content of the aforementioned application, including any intervening amendments thereto, is incorporated herein by reference in its entirety.

TECHNICAL FIELD

The present invention relates to water feeder technical field, more particularly to a filter assembly and a portable water feeder.

BACKGROUND OF THE INVENTION

Pet water feeder is a device for drinking water for pets. Pet water feeder in prior art includes feeding basin, a water storage tank connected to the base of the feeding basin, motor pumps and a timer control box electrically connected the motor pumps. A control valve for controlling the water level of the feeding basin and a circulating water three-way shunt pipe connected to the motor pump are arranged between the water storage tank and the water feeding basin. A shunt branch of a three-way shunt pipe is connected with a filter basin, and a shunt branch is connected with a nozzle that can spray water fog or circulating water into the feeding basin. The disadvantage of this pet water feeder is that it is not portable, the pump needs electricity to work, and it can only be used indoors. In life, pets often need to go outdoors. Obviously, this kind of pet water feeder can't meet the requirements of outdoor use.

SUMMARY OF THE INVENTION

The object of the invention is to provide a filter assembly and a portable water feeder, aiming at solving the technical problem that the water feeder in the prior art is not portable.

In order to achieve the above objection, a filter assembly provided in the present invention includes a tray and a filter piece; the tray includes a bottom frame and a supporting ring.

The bottom frame includes a bottom plate and a supporting wall, the supporting wall is arranged around its circumference of the bottom plate and extends upward, and the supporting wall and the bottom plate are jointly surrounded to form a cavity, and the bottom plate is provided with a number of filter holes.

The supporting ring is arranged above the bottom frame, and the supporting ring is connected to its top of the supporting wall, and the filter piece is placed in the cavity.

Preferably, the middle of the bottom plate is provided with a central hole with an aperture of 13 mm-17 mm, and the inner wall of the central hole is provided an arc surface smoothly transiting to the bottom edge and the top edge of the central hole.

Preferably, the filter hole is a strip-like structure extended from the bottom plate to the supporting wall, and the width of the filter hole is gradually increased from the bottom plate to the supporting wall; and the outer end of the supporting ring is provided with a plurality of protrusions arranged at equal intervals.

The filter piece includes a carbon bag and a filter cotton wrapped outside of the carbon bag.

Its shape of filter cotton fits with that of the cavity; its outer end of the filter cotton exposes the cavity, and its peripheral edge of the outer end of the filter cotton is extended to form a limiting ring that is arranged on said supporting ring.

The filter assembly in the present invention has at least one of the following technical effects: when the filter assembly is used, water flows from the filter hole into the filter piece; the filter assembly has the advantages of simple structure and compact structure.

The present invention also provided with a portable water feeder, which includes a water storage cup with an opening end and the above filter assembly covered the opening end.

The portable water feeder also includes a mounting cover, which is detachably arranged on the water storage cup and is covered on the opening end; the mounting cover is provided with a baffle separating the inner cavity of the mounting cover into a water inlet cavity and a water outlet cavity; the baffle is provided with a first mounting slot which faces the water inlet cavity; its side wall of the first mounting slot is provided with a first air hole and a first outlet hole at the upper and lower positions; its side wall of the mounting cover is provided with a second mounting slot.

The portable water feeder also includes an switching assembly, which includes a connecting cylinder sliding through the baffle, a sealing plate fixed at one end of the connecting cylinder, a slider fixed at the other end of the connecting cylinder and a first elastic part sleeved on the connecting cylinder; both ends of the first elastic part are respectively attached to the baffle and the slider, the sealing plate is placed in the first mounting slot to seal the first air hole and the first outlet hole; when the slider is sliding along the axis of the mounting cover towards the direction of the baffle, it pushes the sealing plate out of the first mounting slot by the connecting cylinder, so that water in the water storage cup can flow into the first outlet hole; the first elastic part resets and pushes the slider to move backward, the slider drives the connecting cylinder and the sealing plate to move in the same direction, and the sealing plate resets and seals the first air hole and the first outlet hole.

The portable water feeder also includes the keystroke mechanism, which includes a keystroke assembly actively limited in the second mounting slot and a second elastic member limited between the keystroke assembly and its bottom wall of the second mounting slot; when the keystroke assembly is pressed, it drives the slider to slide along the shaft of the mounting cover towards the direction close to the baffle; when the keystroke assembly is not suffered force, the second elastic member drives the keystroke assembly to reset.

The portable water feeder also includes a water sink, one end of which is fixedly sleeved on the mounting cover and a water groove is formed on its surface; Its side wall of the water groove is provided with a second air hole and a second water outlet hole at the upper and lower positions; the second water outlet hole is connected with the first water outlet hole; and the second air hole is connected with the first air outlet hole.

Preferably, the key assembly comprises a key base which is arranged in the second mounting slot, a key on the top surface of the key base and a driving cylinder fixed at the bottom of the key base; both ends of the second elastic member are respectively attached to the bottom wall of the second mounting slot and the bottom of the key base; the driving cylinder runs through the mounting sleeve and is perpendicular to the slider, and the end thereof is also provided with a first inclined plane facing the baffle; the top of the slider is provided with a second inclined plane parallel to the first inclined plane; the first inclined plane matches the second inclined plane.

Preferably, the water sink is provided with a connecting end therein formed a cylinder part, its wall of the cylinder part is provided with a key hole; the key hole is configured to enable the key to move forwards and backwards; the key is exposed through the key hole and is activity limited between the inner wall of the cylinder part and the top surface of the key base.

Preferably, the key is sliding connection with the key base; its bottom of the key is fixed with an pillar; the top surface of the key base is provided with a long guide hole; the pillar is inserted into the guide hole and guided therein; both sides of the key are provided with elastic clamping arms; the same end of the two opposite side walls of the second mounting slot is provided with a limiting part, and the other end is provided with a avoiding part. A clamping part is formed on the avoiding part; when the key is slipped to the top of the limiting part, the key is limited to the top of the limiting part through the elastic clamping arm; when the key is slipped to the top of the avoiding part, the elastic clamping arm is clamped at the clamping part, the key can be moved in a longitudinal direction.

Preferably, the inner wall of the cylinder part is provided with a clamping groove; the outer peripheral surface of the mounting cover is provided with a clamping boss matching with the clamping groove; the mounting cover is inserted into the cylinder part, and the clamping boss is connected to the clamping groove.

Preferably, the side wall of the water inlet cavity is provided with a first connecting thread; the outer surface of the opening end of the water storage cup is provided with a second connecting thread matched with the first connecting thread; and the outer surface of the water storage cup or the water groove is provided with a hanging thread hole.

Preferably, the side, attached to the first mounting slot, of the sealing plate is provided with the sealing ring along its circumferential edge; the opening end of the water storage cup is provided with a second sealing ring 130 arranged along its circumference; the bottom wall of the inlet cavity is provided with a sealing groove matching the second sealing ring.

Preferably, the water groove is internally provided with a first pipeline communicated with the second water outlet hole and a second pipeline which is communicated with the second air hole; the first pipeline is inserted into the first water outlet hole; the second pipeline is inserted into the first air hole;

Preferably, the bottom wall of the outlet water cavity is fixed with a guide convex strip extending along the axial direction of the mounting cover; the side of the slider is provided with a guide slot matching the guide convex strip, and the slider is guided on the guide convex strip.

The portable water feeder in the present invention has at least one of the following technical effects: When the portable water feeder is in use, the water storage cup is filled with water, and when the key assembly is pressed, the key assembly drives the slider to slide along the axis of the mounting cover to be close to the direction of the baffle, the slider pushes the sealing plate out of the first mounting groove through the connecting cylinder, so that water in the water storage cup can flow into the first water outlet hole.

The water from the first outlet hole flows out to the water groove through the second outlet hole, and the pet drinks the water in the water groove; when the key assembly is not suffer force, the second elastic part drives the key assembly to reset; the first elastic part restores and pushes the slider to move backwards, the slider drives the connecting cylinder and the sealing plate in the same direction, and the sealing plate restores and seals the first hole and the first outlet hole, thereby disconnecting the water supply. The portable water feeder has the advantages of easy to carry and does not need electricity, and is suitable for the supply of water to pets when they are outdoors.

BRIEF DESCRIPTION OF THE DRAWINGS

In order to explain more clearly the technical proposals in the present invention, the following will briefly introduce the drawings that need to be used in the embodiment or the prior art description. It is obvious that the drawings in the following description are only some embodiments of the invention, and for the ordinary technical personnel in the field, other drawings can be obtained according to these drawings without paying creative labor.

DETAILED DESCRIPTION OF EMBODIMENTS

Embodiments of the present invention are described in detail below, and an example of the embodiment is shown in the attached figure, in which the same or similar label represents the same or similar element or element with the same or similar function from beginning to end. The embodiments described below by reference to the attached drawings are exemplary and are intended to explain embodiments of the present invention and cannot be understood as restrictions on the present invention.

Figure 1:
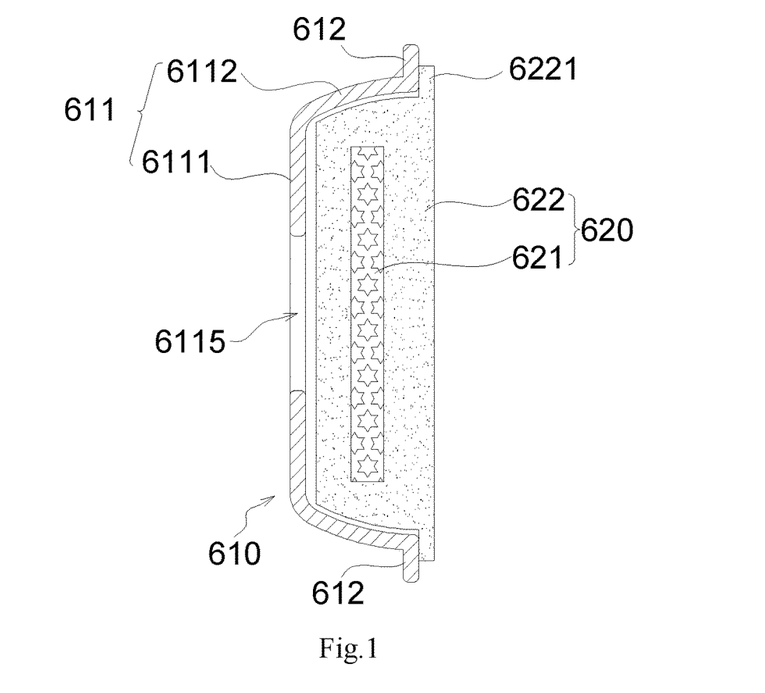
FIG. 1 is a section view of a filter component in the present invention.
Figure 2:
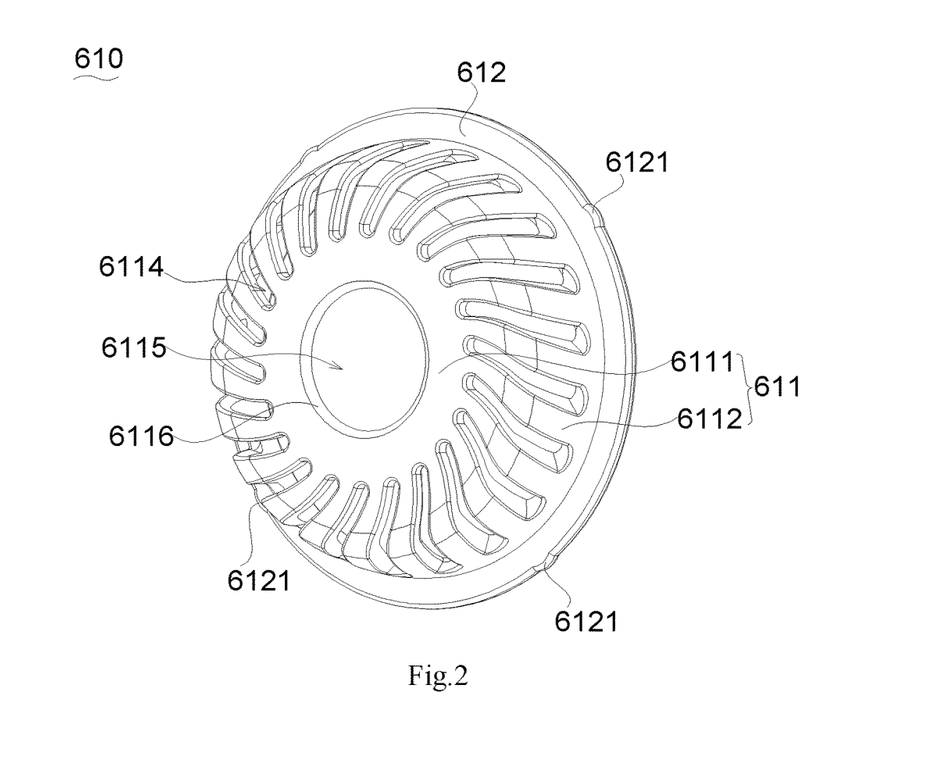
FIG. 2 is a perspective view of the filter tray in the present invention.

Reference to FIG. 1 and FIG. 2, the present invention provides a filter assembly 600, which includes a filter tray 610 and a filter piece 620.

The tray 610 includes a base frame 611 and a supporting ring 612. The connection between the base frame 611 and the supporting ring 612 may be an integrated molding, such as injection molding, die casting, or forging.

The base frame 611 includes a bottom plate 6111 and a supporting wall 6112. The supporting wall 6112 is surrounded by the circumference of the bottom plate 6111 and extends upward. Generally, when the tray 610 is installed in a portable feeder and the portable feeder is placed vertically, the bottom plate 6111 is in a horizontal state, while the supporting wall 6112 is in a vertical state. The supporting wall 6112 and the bottom plate 6111 are enclosed to form a cavity 6113. The filter piece 620 is placed in the cavity 6113 which limits it. The bottom plate 6111 is provided with a number of filter holes 6114. The filter holes 6114 may be arranged at uniform intervals along a ring, and the shape of the filter hole 6114 may be regular or irregular shape.

The supporting ring 612 is arranged above the bottom frame 611, and the supporting ring 612 is connected with the top of the supporting wall 6112 and extends in a horizontal direction away from the cavity 6113. The supporting ring 620 can be mounted in a specific position in the portable water feeder to ensure the installation of the tray 610.

Figure 3:
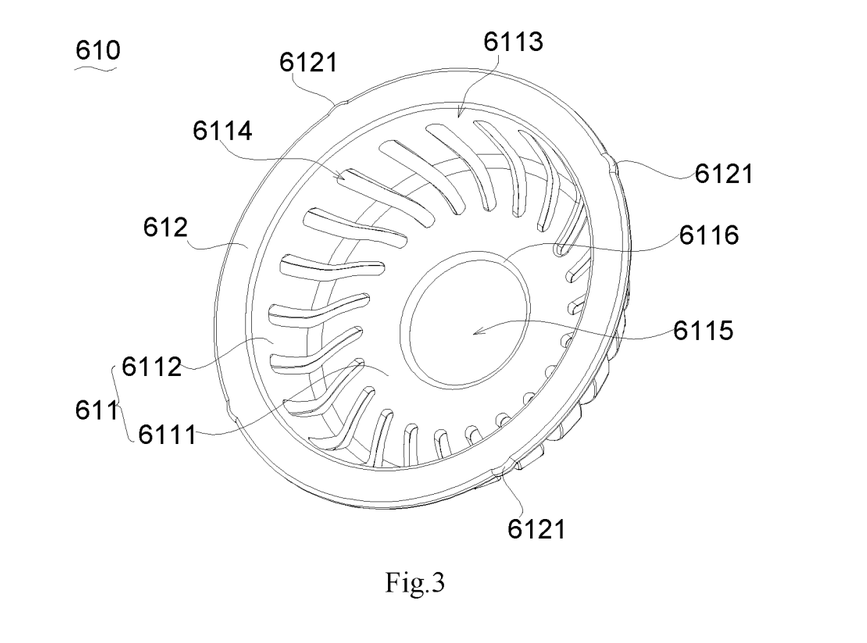
FIG. 3 is another perspective view of the filter tray in the present invention.

In another embodiment of the present invention, reference to FIG. 1, FIG. 2 and FIG. 3, the middle of the bottom plate 6111 of the filter assembly 600 is provided with a central hole 6115 with an aperture of 13 to 17 mm. Specifically, on the one hand the central hole 6115 can supply water through, on the other hand, the finger can be inserted into the central hole 6115 to control the bottom plate 6111 to realize the placement and release of the tray 610. In this way, it is convenient to install and disassemble the tray 610. Specifically, the aperture of the center hole 6115 can be 13 mm, 14 mm, 15 mm, 16 mm or 17 mm, etc. The size is designed to avoid affecting the supportation of the bottom plate 6111 to the filter 6111 because the aperture of the center hole 6115 is too large. At the same time, it does not affect the insertion of the finger because it is too small. This not only ensures that the bottom plate 6111 plays its supporting role, but also realizes the convenience of its assembly and disassembly.

In another embodiment of the present invention, reference to FIG. 1-FIG. 3, the inner wall of the central hole 6115 is provided with an arc surface 6116 smoothly transiting to the bottom edge and the top edge of the central hole 6115. Specifically, the arc surface 6116 is an inverted fillet structure, which can make the corner structure of the bottom edge of the inner wall of the center hole 6115 and the corner structure of the top edge of the inner wall of the center hole 6115 form an arc surface, so that when the user inserts finger into the center hole 6115 to pick the bottom plate 6111, the contact between the finger and the arc surface 6116 is smooth contact, which reduces the discomfort of the finger and improves the comfort of the use.

In another embodiment of the present invention, reference to FIG. 1-FIG. 3, the filter hole 6114 of the filter assembly 600 is a strip-like structure extended from the bottom plate 6111 to the supporting wall 6112. Specifically, the filter hole 6114 is designed as a strip-like structure extended to the supporting wall 6112, so that the effective filtration area of the whole tray 610 can be increased and the filtration effect of the water flow can be improved.

The width of the filter hole 6114 is gradually increased from the bottom plate 611 to the supporting wall 6112. Specifically, the width of the filter hole 6114 on the bottom plate 6111 is smaller than that on the supporting wall 6112, and the width of the filter hole 6114 increases gradually along the direction from the bottom plate 6111 to the supporting wall 6112, thus increasing the filtration speed of the flow.

The long wall of the filter hole 6114 is an inclined surface. Specifically, the long wall of the filter hole 6114 is designed as an inclined surface, so that the flow through it can be guided by the inclined surface, which can make the flow more smoothly and improve the effluent effect.

The outer end of the supporting ring is provided with a plurality of protrusions 6121 arranged at equal intervals. Specifically, the protrusions 6121 can be arranged to facilitate the supporting ring 612 to be clamped to the mounting cover 200, which is beneficial to improve the stability of the installation of the tray 610. Further, the number of the protrusions can be four, six, eight, and so on.

In another embodiment of the present invention, reference to FIG. 1-FIG. 3, the filter piece 620 of the filter assembly 600 includes a carbon bag 621 and a filter cotton 622 wrapped outside of the carbon bag 621, and the filter cotton 622 completely covers the carbon bag 621, so that the water flowing through the filter cotton 622 can be filtered a portion of the particulate impurities and be removed the peculiar smell, which realizes the good purification of the water.

The shape of filter cotton 622 fits with that of the cavity 6113, that is, the shape is similar to that of the tray 610. This design ensures that the stability of filter cotton 622 is better when it is installed in the cavity 6113. Further, the outer end of the filter cotton 622 exposes the cavity 6113, and the peripheral edge of the outer end of the filter cotton 622 is extended to form a limiting ring 6221 that is set up on the supporting ring 612. With the limiting ring 6221, the filter 6113 will not be completely placed in the cavity 6113 after installation. When the filter piece 620 is removed, it can be easily removed by applying the force on the limiting ring 620. The structure design of the filter piece 620 is reasonable and the practicability is strong.

Figure 4:
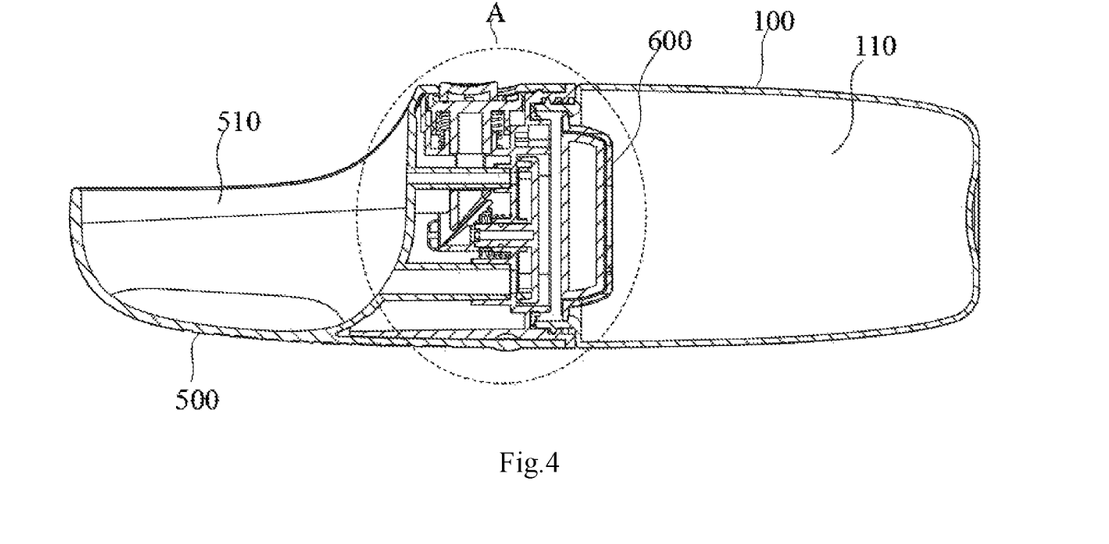
FIG. 4 is a section view of a portable water feeder in the present invention.

The present invention also provided with a portable water feeder which includes a water storage cup 100 with an opening end 111, and a water storage chamber 110 for storing water is formed in the water storage cup 100. The portable water feeder also includes the above filter assembly 600, a mounting cover 200, a switching assembly 300; a keystroke mechanism 400 and a water sink 500.

The filter assembly 600 covers the opening end 111. The filter assembly 600 can filter the water flowing out the opening end 111 and improve the water quality.

The mounting cover 200 is detachably arranged on the water storage cup 100 and is covered on the opening end 111. When the water storage cup 100 is added with water, the mounting cover 200 is removed from the water storage cup 100 and then the water can be added into the water storage cavity 110, which has the advantage of convenient water addition.

The mounting cover 200 is provided with a baffle 210 separating the inner cavity of the mounting cover 200 into a water inlet cavity 220 and a water outlet cavity 230. The baffle 210 and the mounting cover 200 may be connected in an integrated manner, such as injection molding, die casting or forging molding. The baffle 210 is provided with a first mounting slot 211 which faces the water inlet cavity 220. Its side wall of the first mounting slot 211 is provided with a first air hole 213 and a first outlet hole 212 at the upper and lower positions. Its side wall of the mounting cover 200 is provided with a second mounting slot 240.

Figure 5:
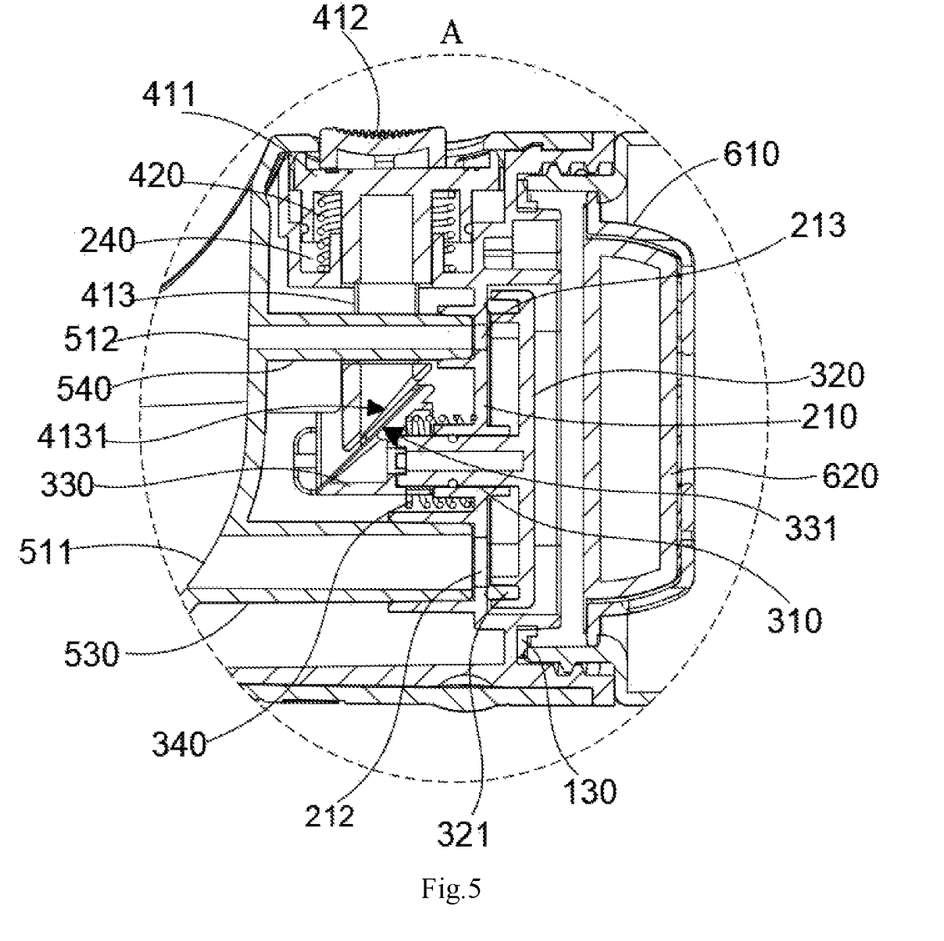
FIG. 5 shows the larger version at A in FIG. 4.

The switching assembly 300 includes a connecting cylinder 310 sliding through the baffle 210, a sealing plate 320 fixed at one end of the connecting cylinder 310, a slider 330 fixed at the other end of the connecting cylinder 310 and a first elastic part 340 sleeved on the connecting cylinder 310. Specifically, the sealing plate 320 and the connecting cylinder 310 may be connected in an integrated manner. The slider 330 and the connecting cylinder 310 may be connected in tight mounting. The first elastic part 340 is a spring. Both ends of the first elastic part 340 are respectively attached to the baffle 210 and the slider 330. The sealing plate 320 is placed in the first mounting slot 211 to seal the first air hole 213 and the first outlet hole 212. When the slider 330 is sliding along the axis of the mounting cover 200 towards the direction close to the water inlet cavity 220, it pushes the sealing plate 320 out of the first mounting slot 211 by the connecting cylinder 310, so that water in the water storage cup 100 can flow into the first outlet hole 212. The first elastic part 340 resets and pushes the slider 330 to move backward, the slider 330 drives the connecting cylinder 310 and the sealing plate 320 to move in the same direction, and the sealing plate 320 resets and seals the first air hole 213 and the first outlet hole 212 to disconnect the water supply.

The keystroke mechanism 400 includes a keystroke assembly 410 actively limited in the second mounting slot 240 and a second elastic member 420 limited between the keystroke assembly 410 and its bottom wall of the second mounting slot 240. When the keystroke assembly 410 is pressed, it drives the slider 330 to slide along the shaft of the mounting cover 200 towards the direction close to the baffle 210. When the keystroke assembly 410 is not suffered force, the second elastic member 420 drives the keystroke assembly 410 to reset.

One end of the water sink 500 is fixedly sleeved on the mounting cover 200 and a water groove 510 is formed on its surface. Its side wall of the water groove 510 is provided with a second air hole 512 and a second water outlet hole 511 at the upper and lower positions. The second water outlet hole 511 is connected with the first water outlet hole 212. The second air hole 512 is connected with the first air outlet hole 213.

When the portable water feeder is used, the water storage cup 100 is filled with water, the keystroke assembly 410 is pressed to dive the slider 330 to move towards the direction closed to the baffle 210 along the shaft of the mounting cover 200, the slider 330 pushes the sealing plate 320 out of the first mounting slot 211 by the connecting cylinder 310, so that water in the water storage cup 100 can flow into the first outlet hole 212. The water in the first outlet hole 212 is then flowed out to the water groove 510 through the second outlet hole 511, and the pet can drink the water in the water groove 510. When the keystroke assembly 410 is not pressed, the second elastic member 420 drives the keystroke assembly 410 to reset. The first elastic part 340 resets and pushes the slider 330 to move backward, the slider 330 drives the connecting cylinder 310 and the sealing plate 320 to move in the same direction, and the sealing plate 320 resets and seals the first air hole 213 and the first outlet hole 212 to disconnect the water supply.

In another embodiment of the present invention, the key assembly 410 comprises a key base 400 which is arranged in the second mounting slot 240, a key 412 on the top surface of the key base 411 and a driving cylinder 413 fixed at the bottom of the key base 411. Specifically, the key base 411 and the driving cylinder 413 may be connected in an integrated manner. Both ends of the second elastic member 420 are respectively attached to the bottom wall of the second mounting slot 240 and the bottom of the key base 311. The driving cylinder 413 runs through the mounting sleeve 230 and is perpendicular to the slider 330, and the end thereof is also provided with a first inclined plane 4131 facing the water inlet cavity 220; the top of the slider 330 is provided with a second inclined plane 331 parallel to the first inclined plane 431; the first inclined plane 4311 matches the second inclined plane 331.

Figure 8:
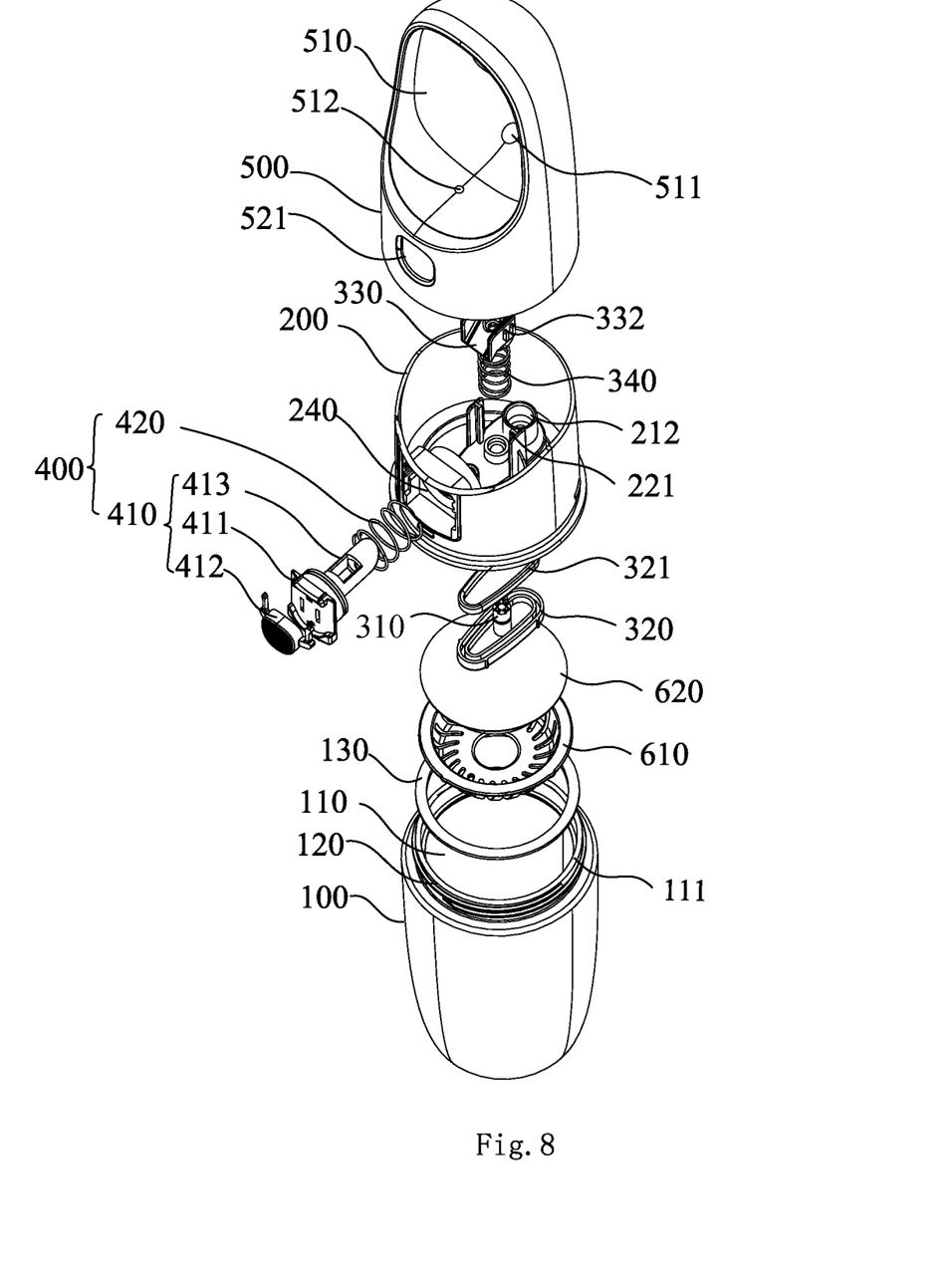
FIG. 8 is an exploded view of a portable water feeder in the present invention.

In another embodiment of the present invention, as shown in FIG. 8, the bottom wall of the water outlet chamber 220 of the portable water feeder is provided with a guide rib 221 extending in the axial direction of the mounting cover 200. Specifically, the baffle 210 and the guide rib 221 may be connected in integral manner. The guide ribs 221 are preferably two, and the two guide ribs 221 are symmetrically distributed. Both side surfaces of the slider 330 are provided with a guide groove 332 matched the guide strip 221, and the slider 330 is guided on the guide strip 221. The advantages of the structure are a simple structure and stable connection.

The working principle of the keystroke assembly 410 is as follows: When the key 412 is pressed, the key base 411 and the driving cylinder 413 move downward, and the second elastic member 420 is in a compression state. The driving cylinder 413 compresses the slider 4311 along the axis of the mounting cover 200 in a direction close to the inlet cavity 220 through the coordination relationship between the first oblique plane 4311 and the second inclined plane 331, at this time, the first elastic member 340 is in a compression state. The slider 330 pushes the sealing plate 320 away from the first mounting slot 211 through the connecting cylinder 310, thereby connecting the first outlet hole 212 and the first air hole 213 with the water storage chamber 110 to realize the water supply. When the key 412 is released, the second elastic member 420 drives the key base 411 and the driving cylinder 413 to reset, the first elastic member 340 resets and pushes the slider 330 to move backwards, the slider 330 drives the connecting cylinder 310 and the sealing plate 320 to move in the same direction, and the sealing plate 320 is reset and sealed the first air hole 213 and the first outlet hole 212, thereby disconnecting the water supply.

Figure 6:
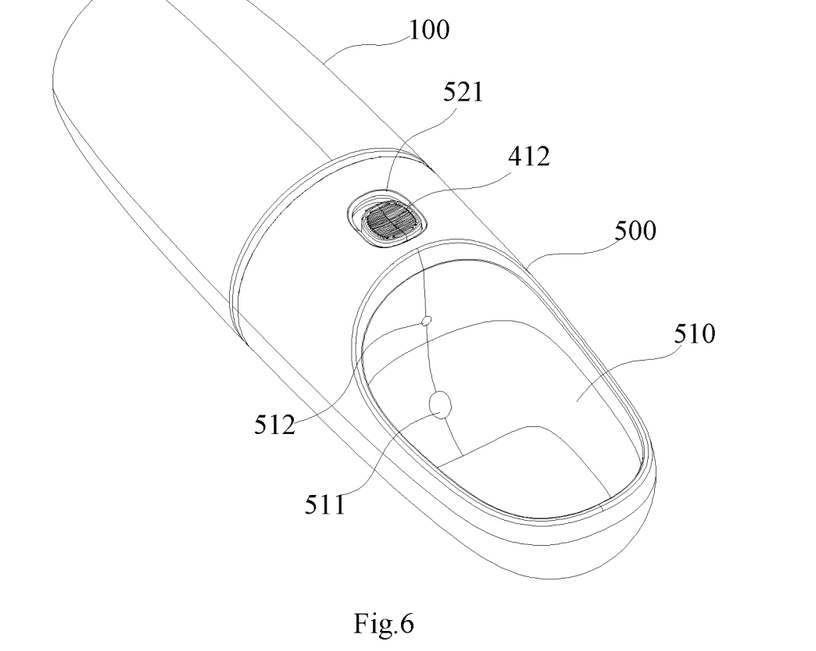
FIG. 6 is a perspective view of a portable water feeder in the present invention.
Figure 9:
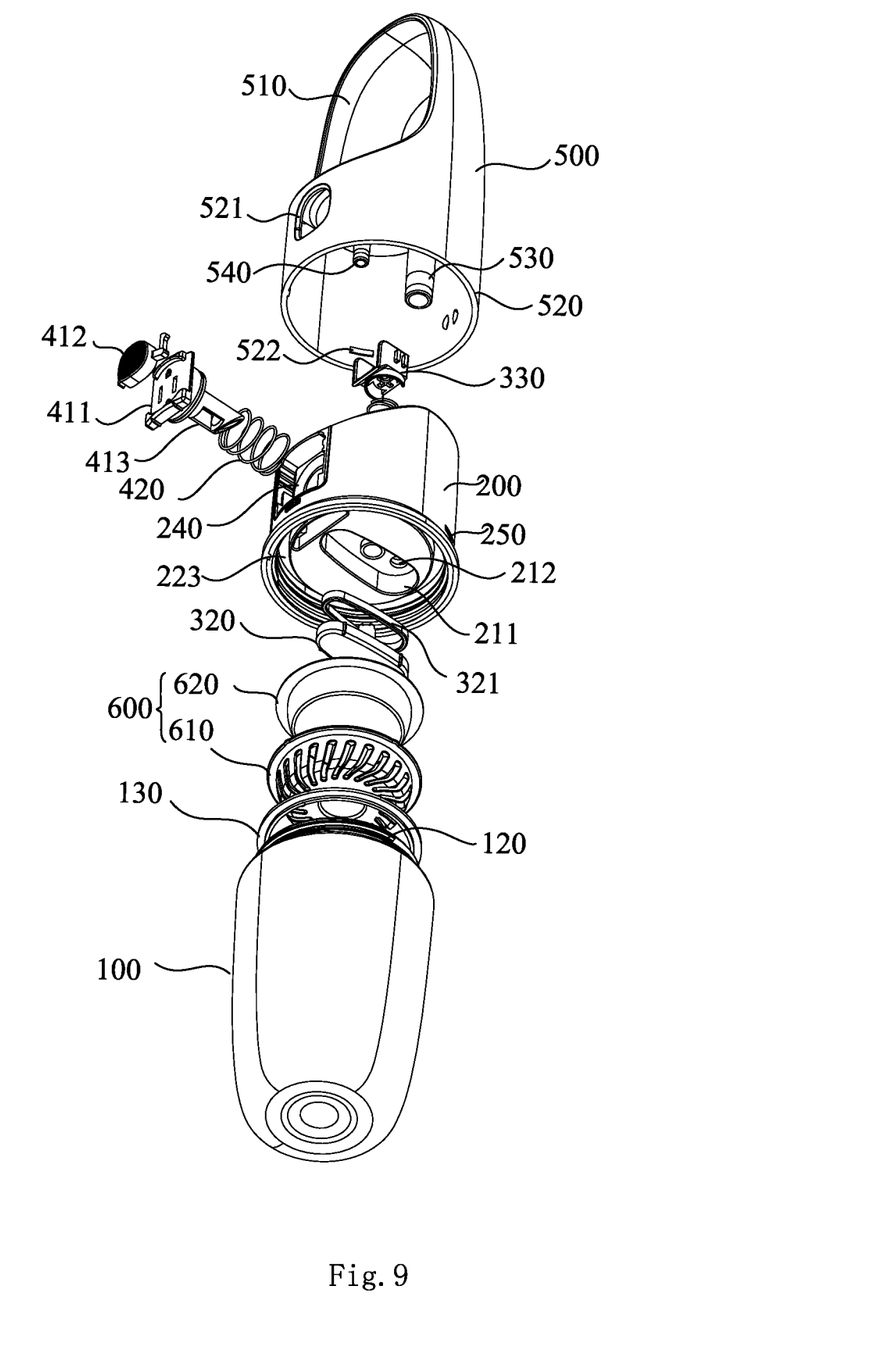
FIG. 9 is another exploded view of a portable water feeder in the present invention.
Figure 10:
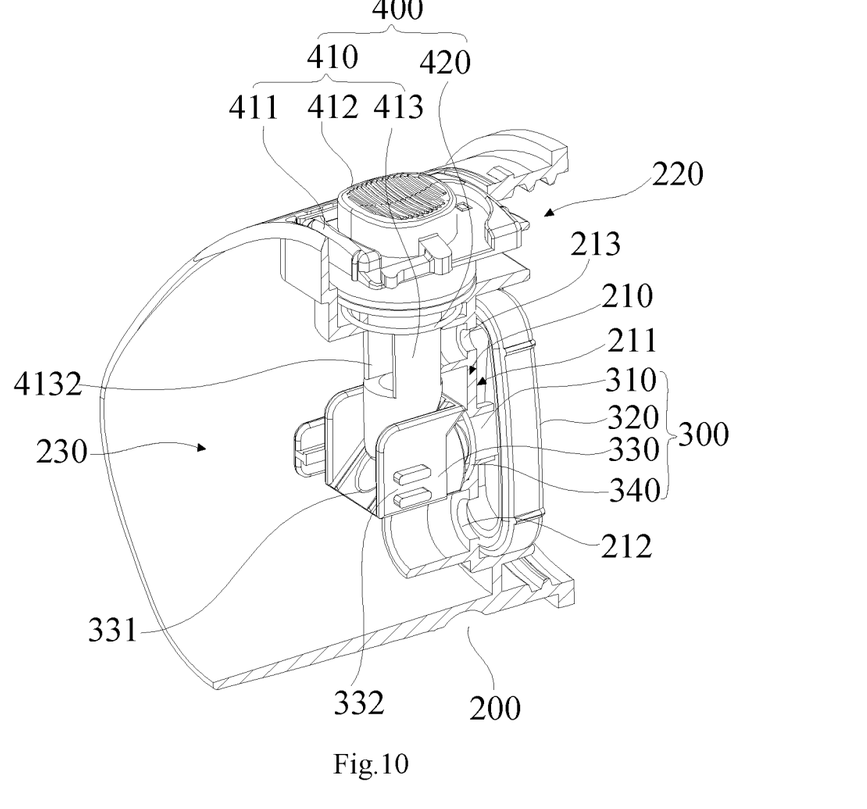
FIG. 10 is a perspective view of a key mechanism and a switch assembly in the present invention.
Figure 11:
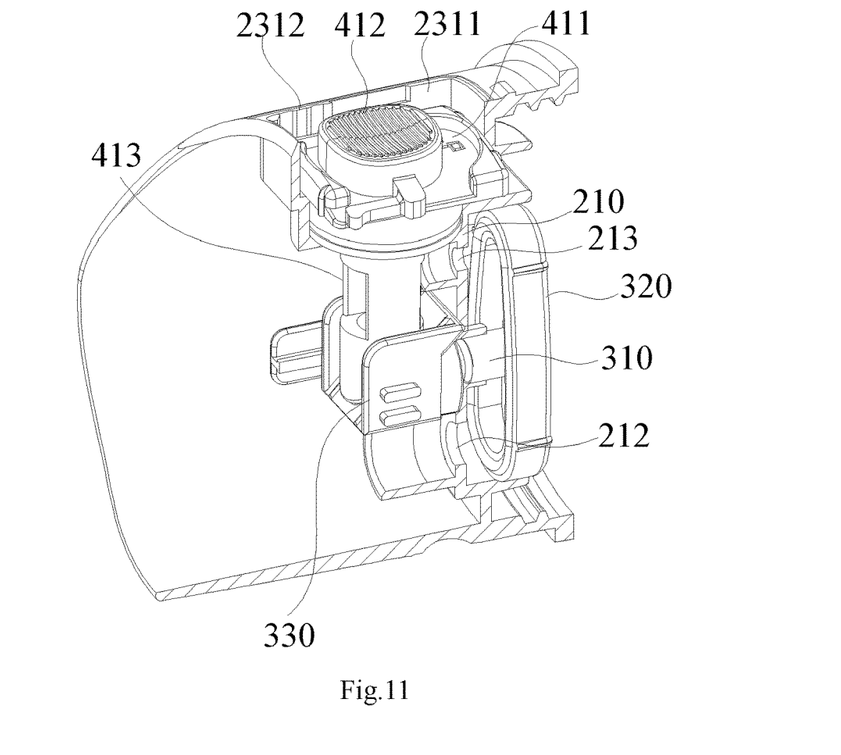
FIG. 11 is a perspective view of a key assembly in pressed state in the present invention.
Figure 12:
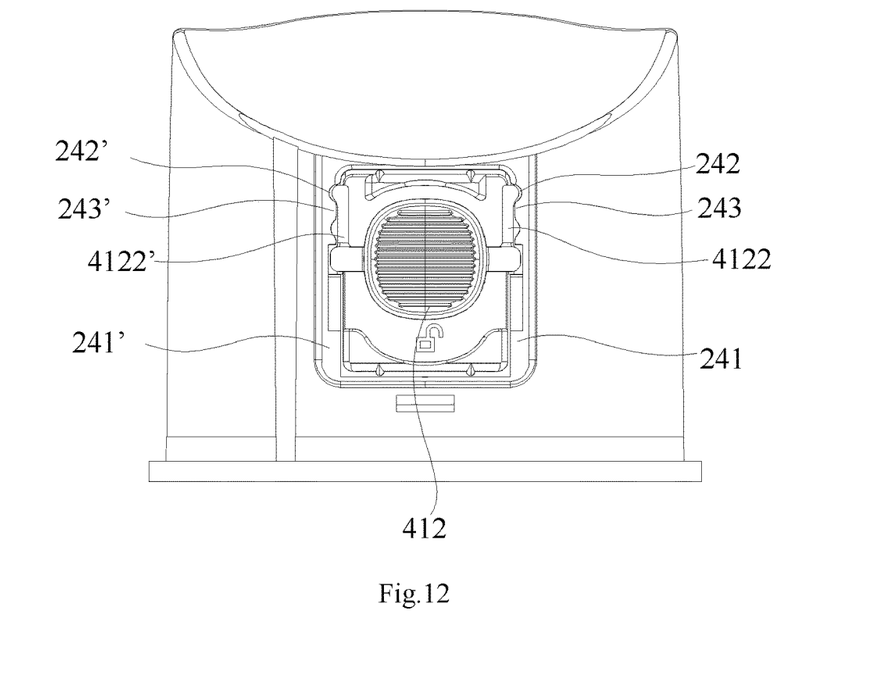
FIG. 12 is a perspective view of the mounting cover and the key assembly in the present invention.
Figure 13:
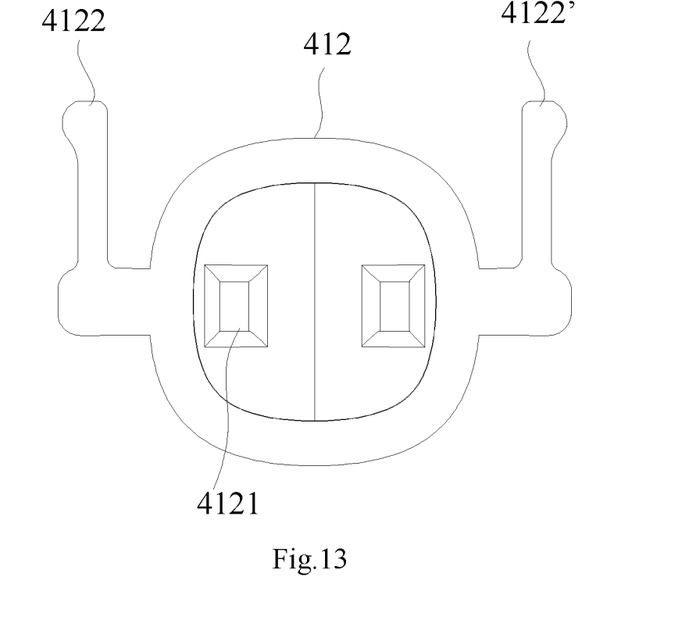
FIG. 13 is a back view of the keys in the present invention.
Figure 14:
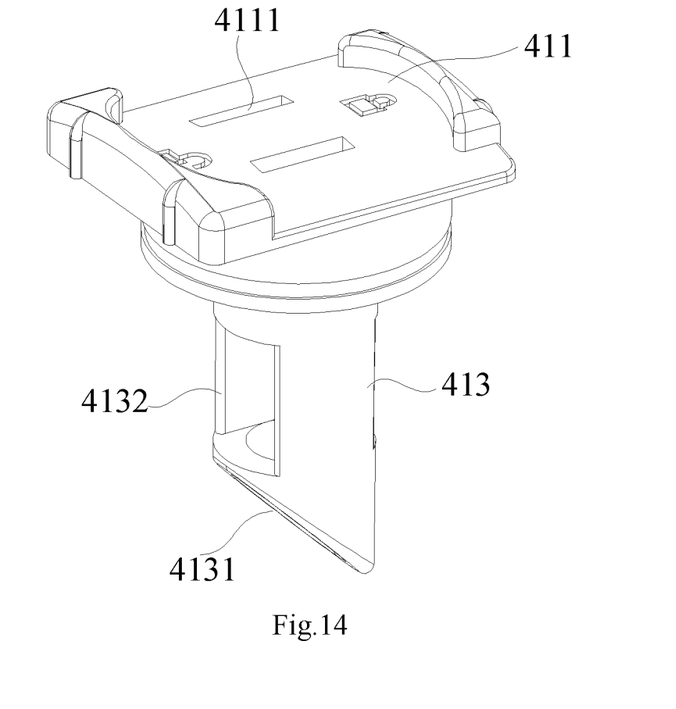
FIG. 14 is a perspective view of a key base in the present invention.

In another embodiment of the present invention, as shown in FIG. 6 and FIG. 9, the water sink 500 is provided with a connecting end therein formed a cylinder part 520, which is hollow in structure and has an opening. The wall of the cylinder part 520 is provided with a key hole 521. The key hole 521 is configured to enable the key 412 to move forwards and backwards. The key 412 is exposed through the key hole 521 and its activity is limited between the inner wall of the cylinder part 520 and the top surface of the key base 411.

In another embodiment of the present invention, as shown in FIG. 10-FIG. 14, the key is sliding connection with the key base 411. Its bottom of the key 412 is fixed with a pillar 4121. Specifically, the pillar 4121 and the button 4121 is connected in integrate manner, and the number of the insert column 4121 is two. The top surface of the key base 411 is provided with a long guide hole 4111. Specifically, the number of guide holes 4111 is equal to that of the pillar 4121. The pillar 4121 is inserted into the guide hole 4111 and guided therein. Both sides of the key are provided with the elastic clamping arms 4122, 4122'. Specifically, the elastic clamping arms 4122, 4122' and the key 412 may be connected in integral manner. The same end of the two opposite side walls of the second mounting slot 240 is provided with a limiting part 241, 241', and the other end is provided with a avoiding part 242, 242'. A clamping part 243, 243' is formed on the avoiding part 242, 242' respectively.

The key 412 has two working states. The first working state is: when the key 412 is slipped to the top of the limiting part 241, 241', the key 412 is limited to the top of the limiting part 241, 241' through the elastic clamping arm 4122, 4122'. The key 412 does not move down when it suffers force.

The second working state is: when the key 412 is slipped to the top of the avoiding part 242, 242', the elastic clamping arm 4122, 4122' is clamped at the clamping part 243, 243', the clamping part 243, 243' limits the horizontal activity of the key 412 through the elastic clamping arm 4122, 4122'. In this case, that key 412 may be movable in the longitudinal direction to drive the key base 411 in the longitudinal direction, When the portable water feeder is not in use, the key 412 is set to the first working state to prevent accidental water supply due to misoperation. When the portable water feeder is needed to supply water, the key 412 is pushed, the key 412 to slip and be set to the second working state, and the button 412 is pressed to realize the water supply, which is convenient to operate and practical in function.

In another embodiment of the present invention, as shown in FIG. 9, the inner wall of the cylinder part 520 is provided with a clamping groove 522. Specifically, the number of the clamping grooves 522 is not less than two and is evenly distributed around the inner wall of the cylinder 520. The outer peripheral surface of the mounting cover 200 is provided with a clamping boss 250 matching with the clamping groove 500. Specifically, the number of the clamping boss 250 is equal to that of the clamping grooves 522. The mounting cover 200 is inserted into the cylinder part 520, and the clamping boss 250 is jammed with the clamping groove 522. The mounting sleeve 230 is jammed with the cylinder part 520, which has the advantages of convenient disassembly and assembly.

In another embodiment of the present invention, as shown in FIG. 9, the side wall of the water inlet cavity 220 is provided with a first connecting thread 222; the outer surface of the opening end of the water storage cup 100 is provided with a second connecting thread 120 matched with the first connecting thread 222. The mounting cover 200 is detachably mounted on the water storage cup 100 by screw connection and capped to the opening end 111 of the water storage cavity 110, which has the advantages of convenient disassembly and assembly and good sealing.

Figure 7:
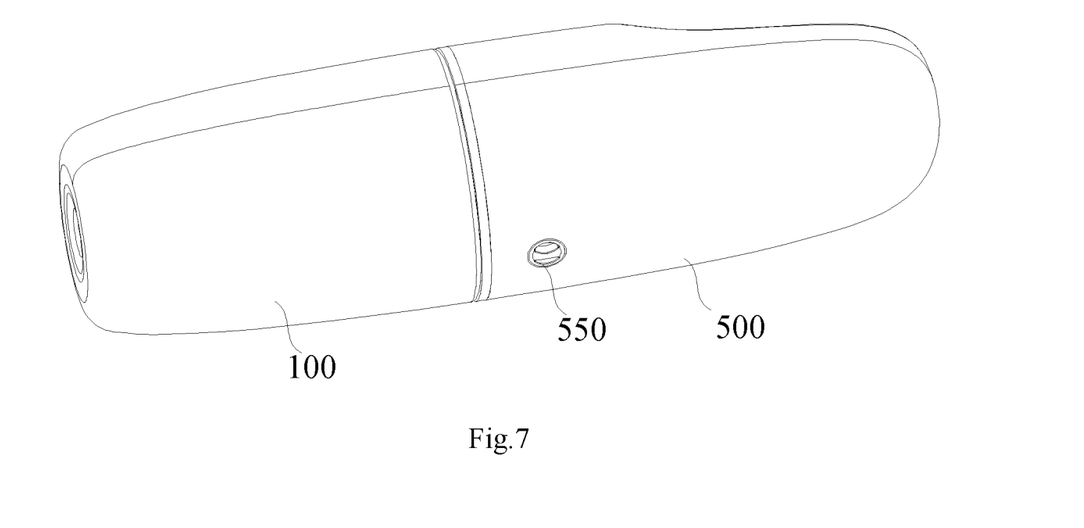
FIG. 7 is another perspective view of a portable water feeder in the present

In another embodiment of the present invention, as shown in FIG. 7, the outer surface of the water storage cup 100 or that of the water groove 500 is provided with a hanging thread hole 550. When in use, after the wire is passed through the hanging thread hole 550, the head and tail of the thread are connected to form a coil, and then the portable water feeder can be suspended on other objects through the coil to facilitate the user to carry it.

In another embodiment of the present invention, as shown in FIG. 5 and FIG. 8, the side, attached to the first mounting slot 211, of the sealing plate 320 is provided with the sealing ring along its circumferential edge. The first sealing ring 321 improves the sealing effect between the sealing plate 320 and the first mounting slot 211 to prevent leakage.

In another embodiment of the present invention, as shown in FIG. 5 and FIG. 8, the opening end of the water storage cup 100 is provided with a second sealing ring 130 arranged along its circumference. The bottom wall of the inlet cavity 220 is provided with a sealing groove 223 matching the second sealing ring 130. When the mounting cover 200 is installed on the water storage cup 100, the second sealing ring 130 is accommodated in the sealing slot 223, and the second sealing ring 130 improves the sealing effect between the mounting cover 200 and the water storage cup 100 to prevent water leakage.

In another embodiment of the present invention, as shown in FIG. 5, the water groove 500 is internally provided with a first pipeline 530 communicated with the second water outlet hole 511 and a second pipeline 540 which is communicated with the second air hole 512. The first pipeline 530 is inserted into the first water outlet hole 212. The second pipeline 540 is inserted into the first air hole 213. Specifically, the second pipe 540 passes through the driving cylinder 413, and the driving cylinder 413 is provided with an avoidance hole 4132. The first pipe 530 and the second pipe 540 play a connecting role and have the advantages of good sealing effect.

The foregoing is merely a preferred embodiment of the present invention and is not intended to limit the invention and that any modifications, equivalents, and modifications made within the spirit and principles of the invention are intended to be included within the scope of the present invention.

What is claimed:

1. An portable water feeder, wherein comprising a water storage cup with an opening end and a filter assembly, said filter assembly covers said opening end; said filter assembly, includes a tray and a filter piece;

wherein also comprising a mounting cover, detachably arranged on said water storage cup and covered on said opening end; said mounting cover is provided with an inner cavity and a baffle separating said inner cavity into a water inlet cavity and a water outlet cavity; said baffle is provided with a first mounting slot which faces said water inlet cavity; a side wall of said first mounting slot is provided with a first air hole and a first outlet hole at upper and lower positions; a side wall of said mounting cover is provided with a second mounting slot;

a switching assembly, which includes a connecting cylinder sliding through said baffle, a sealing plate fixed at one end of said connecting cylinder, a slider fixed at the other end of said connecting cylinder and a first elastic part sleeved on said connecting cylinder; both ends of said first elastic part are respectively attached to said baffle and said slider, said sealing plate is placed in said first mounting slot to seal said first air hole and said first outlet hole; when said slider is sliding along an axis of said mounting cover towards said baffle, said slider pushes said sealing plate out of said first mounting slot by said connecting cylinder, so that water in said water storage cup can flow into said first outlet hole; said first elastic part resets and pushes said slider to move backward, said slider drives said connecting cylinder and said sealing plate to move in the same direction, and said sealing plate resets and seals said first air hole and said first outlet hole;

a keystroke mechanism, which includes a keystroke assembly actively limited in said second mounting slot and a second elastic member limited between said keystroke assembly and a bottom wall of said second mounting slot; when said keystroke assembly is pressed, said keystroke assembly drives said slider to slide along said axis of said mounting cover towards a direction close to said baffle; when said keystroke assembly is not suffered force, said second elastic member drives said keystroke assembly to reset; and a water sink, one end of said water sink is fixedly sleeved on said mounting cover and a water groove is formed on a surface of said water sink; a side wall of said water groove is provided with a second air hole and a second water outlet hole at upper and lower positions; said second water outlet hole is connected with said first water outlet hole; and said second air hole is connected with said first air outlet hole.

2. The portable water feeder according to claim 1, wherein said key assembly comprises a key base which is arranged in said second mounting slot, a key on a top surface of said key base and a driving cylinder fixed at a bottom of said key base; both ends of said second elastic member are respectively attached to said bottom wall of said second mounting slot and said bottom of said key base; said driving cylinder runs through said mounting sleeve and is perpendicular to said slider, and an end of said driving cylinder is also provided with a first inclined plane facing said baffle; a top of said slider is provided with a second inclined plane parallel to said first inclined plane; said first inclined plane matches said second inclined plane.

3. The portable water feeder according to claim 2, wherein said water sink is provided with a connecting end therein formed a cylinder part, a wall of said cylinder part is provided with a key hole; said key hole is configured to enable said key to move forwards and backwards; said key is exposed through said key hole and is activity limited between an inner wall of said cylinder part and said top surface of said key base.

4. The portable water feeder according to claim 3, wherein said key is sliding connection with said key base; a bottom of said key is fixed with a pillar; said top surface of said key base is provided with a long guide hole; said pillar is inserted into said guide hole and guided therein; both sides of said key are provided with elastic clamping arms; the same end of two opposite side walls of said second mounting slot is provided with a limiting part, and the other end is provided with an avoiding part; a clamping part is formed on said avoiding part; when said key is slipped to a top of said limiting part, said key is limited to said top of said limiting part through said elastic clamping arms; when said key is slipped to a top of said avoiding part, said elastic clamping arms are clamped at said clamping part, said key can be moved in a longitudinal direction.

5. The portable water feeder according to claim 4, wherein said inner wall of said cylinder part is provided with a clamping groove; an outer peripheral surface of said mounting cover is provided with a clamping boss matching said clamping groove; said mounting cover is inserted into said cylinder part, and said clamping boss is connected to said clamping groove.

6. The portable water feeder according to claim 1, wherein a side wall of said water inlet cavity is provided with a first connecting thread; an outer surface of said opening end of said water storage cup is provided with a second connecting thread matched with said first connecting thread; and said outer surface of said water storage cup or said water groove is provided with a hanging thread hole.

7. The portable water feeder according to claim 1, wherein a side, attached to said first mounting slot, of said sealing plate is provided with a first sealing ring along a circumferential edge thereof; said opening end of said water storage cup is provided with a second sealing ring arranged along a circumference thereof; said bottom wall of said water inlet cavity is provided with a sealing groove matching with said second sealing ring.

8. The portable water feeder according to claim 1, wherein said water groove is internally provided with a first pipeline communicated with said second water outlet hole and a second pipeline which is communicated with said second air hole; said first pipeline is inserted into said first water outlet hole; said second pipeline is inserted into said first air hole.

9. The portable water feeder according to claim 1, wherein said bottom wall of said water outlet cavity is fixed with a guide convex strip extending along said axis of said mounting cover; a side of said slider is provided with a guide slot matching said guide convex strip, and said slider is guided on said guide convex strip.

\* \* \* \* \*